(12) United States Patent
Bober

(10) Patent No.: US 7,574,049 B2
(45) Date of Patent: Aug. 11, 2009

(54) METHOD, APPARATUS, COMPUTER PROGRAM, COMPUTER SYSTEM AND COMPUTER-READABLE STORAGE FOR REPRESENTING AND SEARCHING FOR AN OBJECT IN AN IMAGE

(75) Inventor: Miroslaw Z. Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/980,482

(22) Filed: Oct. 31, 2007

(65) Prior Publication Data

US 2008/0065613 A1 Mar. 13, 2008

Related U.S. Application Data

(62) Division of application No. 09/786,352, filed on Mar. 13, 2001.

(51) Int. Cl.
*G06K 9/46* (2006.01)
(52) U.S. Cl. .............. 382/203; 382/165; 382/209; 382/305; 707/3; 707/E17.021; 707/E17.023; 707/E17.024
(58) Field of Classification Search ............... 348/143, 348/169; 382/103, 181, 195, 218, 224, 165, 382/203, 209, 220, 305; 707/6, 3, E17.021, 707/E17.023, E17.024, E17.03
See application file for complete search history.

(56) References Cited

U.S. PATENT DOCUMENTS

| 5,751,286 | A | * | 5/1998 | Barber et al. ............... 715/835 |
| 5,893,095 | A | * | 4/1999 | Jain et al. ..................... 707/6 |
| 6,711,287 | B1 | * | 3/2004 | Iwasaki ..................... 382/165 |
| 6,807,303 | B1 | * | 10/2004 | Kim et al. ................... 382/203 |
| 6,941,323 | B1 | * | 9/2005 | Galperin ................. 707/104.1 |
| 2002/0118881 | A1 | * | 8/2002 | Choi et al. .................. 382/203 |
| 2007/0022329 | A1 | * | 1/2007 | Adamek et al. ............ 714/701 |
| 2008/0052372 | A1 | * | 2/2008 | Weber et al. ................ 709/217 |

FOREIGN PATENT DOCUMENTS

| GB | 2-246 230 | 1/1992 |
| JP | 6-309465 A | 10/1994 |
| JP | 10-55447 A | 2/1998 |

OTHER PUBLICATIONS

Farzin Mokhtarian, Sadegh Abbasi and Josef Kittler, "Robust and Efficient Shape Indexing through Curvature Scale Space," Proc. British Machine Vision Conference, pp. 53-62, Edinburgh, UK, 1996.
Farzin Mokhtarian, Sadegh Abbasi and Josef Kittler, "Indexing an Image Database by Shape Content Using Curvature Scale Space," Proc. IEE Colloquium on Intelligent Databases, London, 1996.

(Continued)

*Primary Examiner*—Gregory M Desire
(74) *Attorney, Agent, or Firm*—Birch, Stewart, Kolasch & Birch, LLP

(57) ABSTRACT

A method of representing an object appearing in a still or video image, by processing signals corresponding to the image, comprises deriving a curvature scale space (CSS) representation of the object outline by smoothing the object outline, deriving at least one additional parameter reflecting the shape or mass distribution of a smoothed version of the original curve, and associating the CSS representation and the additional parameter as a shape descriptor of the object.

15 Claims, 2 Drawing Sheets

OTHER PUBLICATIONS

F. Mokhtarian, "Silhouette-based Occluded Object Recognition Through Curvature Scale Space," Machine Vision and Applications (1997), pp. 87-97.

David Yuk-Ming Chan and Irwin King, "Genetic Algorithm for Weights Assignment in Dissimilarity Function for Trademark Retrieval," Visual 1999, pp. 557-565.

* cited by examiner

METHOD, APPARATUS, COMPUTER PROGRAM, COMPUTER SYSTEM AND COMPUTER-READABLE STORAGE FOR REPRESENTING AND SEARCHING FOR AN OBJECT IN AN IMAGE

CROSS-REFERENCE TO RELATED APPLICATION

This application is a Divisional of co-pending application Ser. No. 09/786,352, filed on Mar. 13, 2001, the entire contents of which are hereby incorporated by reference and for which priority is claimed under 35 U.S.C. § 120.

TECHNICAL FIELD

The present invention relates to the representation of an object appearing in a still or video image, such as an image stored in a multimedia database, especially for searching purposes, and to a method and apparatus for searching for an object using such a representation.

BACKGROUND ART

In applications such as image or video libraries, it is desirable to have an efficient representation and storage of the outline or shape of objects or parts of objects appearing in still or video images. A known technique for shape-based indexing and retrieval uses Curvature Scale Space (CSS) representation. Details of the CSS representation can be found in the papers "Robust and Efficient Shape Indexing through Curvature Scale Space" Proc. British Machine Vision conference, pp 53-63, Edinburgh, UK, 1996 and "Indexing an Image Database by Shape Content using Curvature Scale Space" Proc. IEE Colloquium on Intelligent Databases, London 1996, both by F. Mokhtarian, S. Abbasi and J. Kittler, the contents of which are incorporated herein by reference.

The CSS representation uses a curvature function for the outline of the object, starting from an arbitrary point on the outline. The curvature function is studied as the outline shape is evolved by a series of deformations which smooth the shape. More specifically, the zero crossings of the derivative of the curvature function convolved with a family of Gaussian filters are computed. The zero crossings are plotted on a graph, known as the Curvature Scale Space, where the x-axis is the normalised arc-length of the curve and the y-axis is the evolution parameter, specifically, the parameter of the filter applied. The plots on the graph form loops characteristic of the outline. Each convex or concave part of the object outline corresponds to a loop in the CSS image. The co-ordinates of the peaks of the most prominent loops in the CSS image are used as a representation of the outline.

To search for objects in images stored in a database matching the shape of an input object, the CSS representation of an input shape is calculated. The similarity between an input shape and stored shapes is determined by comparing the position and height of the peaks in the respective CSS images using a matching algorithm.

It is also known from the first-mentioned paper above to use two additional parameters, circularity and eccentricity of the original shape, to reject from the matching process shapes with significantly different circularity and eccentricity parameters.

A problem with the representation as described above is that retrieval accuracy is sometimes poor, especially for curves which have a small number of concavities or convexities. In particular, the representation cannot distinguish between various convex curves.

An aspect of the present invention is to introduce an additional means of describing the shape of the "prototype contour shape". The prototype contour shape is defined here preferably as:

1) The original shape if there are no convexities or concavities in the contour (i.e. there are no peaks in the CSS image), or 2) The contour of the shape after smoothing equivalent to the highest peak in the CSS image.

Note, that the prototype contour shape is always convex.

For example, the shape of the prototype contour can be described by means of the invariants based on region moments as described in the paper "Visual Pattern Recognition by Moments Invariants", IEEE Transaction on Information Theory, Vol. IT-8, 179-187, 1962 by M. K. Hu the contents of which are incorporated herein by reference or using the Fourier descriptors as described in the paper "On Image Analysis by the Methods of Moments", IEEE Transactions on Pattern Analysis and Machine Intelligence, Vol. 10, No. 4, July 1988, by Cho-Huak The, the contents of which are incorporated herein by reference, or parameters such as eccentricity, circularity, etc. In the known method mentioned above, eccentricity and circularity is only used in relation to the original shape. Here we use it in relation to a "prototype shape", which is different for curves which have at least one CSS peak. Another difference is that in the known method eccentricity and circularity are used to reject certain shapes from the similarity matching, and here we use them (in addition to CSS peaks) to derive the value of the similarity measure. Finally, we extend the additional parameters used in the matching process to the moment invariants, Fourier descriptors and Zernike Moments.

As a result of the invention, the retrieval accuracy can be improved.

DISCLOSURE OF INVENTION

A method of representing an object appearing in a still or video image, by processing signals corresponding to the image set forth in claim 1, the method comprises deriving a curvature scale space (CSS) representation of the object outline by smoothing the object outline, deriving at least one additional parameter reflecting the shape or mass distribution of a smoothed version of the original curve, and associating the CSS representation and the additional parameter as a shape descriptor of the object.

In a method set forth in claim 2, an additional parameter relates to the smoothed outline corresponding to a peak in the CSS image.

In a method set forth in claim 3, an additional parameter relates to the smoothed outline corresponding to the highest peak in the CSS image.

In a method set forth in claim 4, an additional parameter corresponds to the eccentricity of the outline.

In a method set forth in claim 5, an additional parameter corresponds to the circularity of the outline.

In a method set forth in claim 6, at least one additional parameter uses a region-based representation.

In a method set forth in claim 7, an additional parameter is a region moment invariant.

In a method set forth in claim 8, an additional parameter is based on Fourier descriptors.

In a method set forth in claim 9, an additional parameter is based on Zernike moments of the region enclosed by the outline.

A method of representing a plurality of objects appearing in a still or video image, by processing signals corresponding to the images set forth in claim 10, the method comprises, for each object outline, determining if there are significant changes in curvature in the object outline, and, if there are significant changes in curvature of the object outline, then deriving a shape descriptor using a method as claimed in any one of claims 1 to 9 and, if there are no significant changes in curvature of the object outline, then deriving a shape descriptor including at least said additional parameter reflecting the shape of the object outline.

In a method set forth in claim 11, the additional parameter for an object outline having no significant changes in curvature is based on region moment invariants, Fourier descriptors or Zernike moments of the outline.

A method of searching for an object in a still or video image by processing signals corresponding to images set forth in claim 12, the method comprises inputting a query in the form of a two-dimensional outline, deriving a descriptor of said outline using a method as claimed in any one of claims 1 to 11, and comparing said query descriptor with each descriptor for stored objects using a matching procedure using the CSS values and the additional parameters to derive a similarity measure, and selecting and displaying at least one result corresponding to an image containing an object for which the comparison indicates a degree of similarity between the query and said object.

In A method set forth in claim 13, the similarity measure is based on M where M=a*GP-S+CSS-S where GP-S is the similarity measure between additional parameters of the compared object outlines and CSS-S is the similarity measure between the CSS values for the compared object outlines, and a is a constant.

In a method set forth in claim 14, a depends on the number and height of the CSS peaks.

In a method set forth in claim 15, a=1 when there are no CSS peaks associated with either outline and a=0 when at least one outline has a CSS peak.

A method of searching for an object in a still or video image by processing signals corresponding to images set forth in claim 16, the method comprises calculating a similarity measure between two object outlines using a CSS representation of said outlines and additional parameters reflecting the shape of or mass distribution within the original outline or a smoothed version of the outline.

An apparatus set forth in claim 17 is adapted to implement a method as claimed in any one of claims 1 to 16.

A computer program set forth in claim 18 implements a method as claimed in any one of claims 1 to 16.

A computer system set forth in claim 19 is programmed to operate according to a method as claimed in any one of claims 1 to 16.

A computer-readable storage medium set forth in claim 20 stores computer-executable process steps for implementing a method as claimed in any one of claims 1 to 16.

A method of representing objects in still or video images set forth in claim 21 is described with reference to the accompanying drawings.

A method of searching for objects in still or video images set forth in claim 22 is described with reference to the accompanying drawings.

A computer system set forth in claim 23 is described with reference to the accompanying drawings.

BEST MODE FOR CARRYING OUT THE INVENTION

First Embodiment

Figure 1:
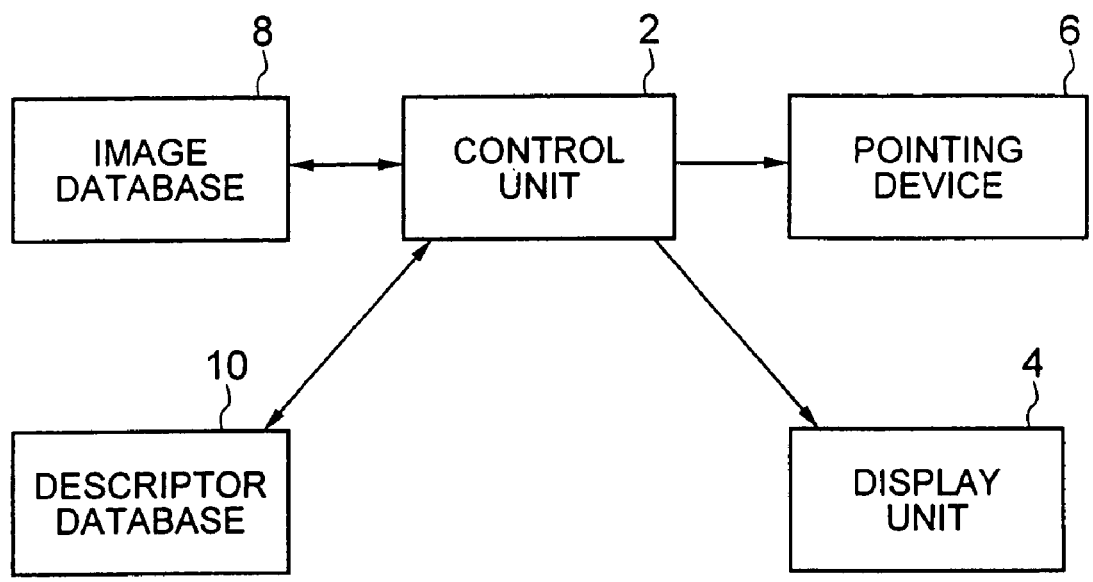
FIG. 1 is a block diagram of a video database system.
Figure 2:
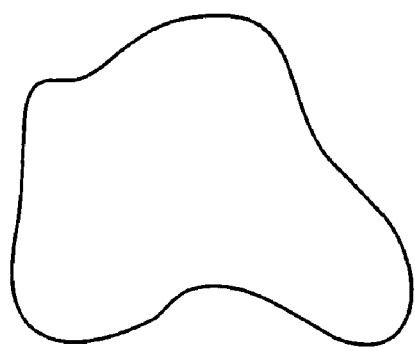
FIG. 2 is a drawing of an outline of an object.
Figure 3:
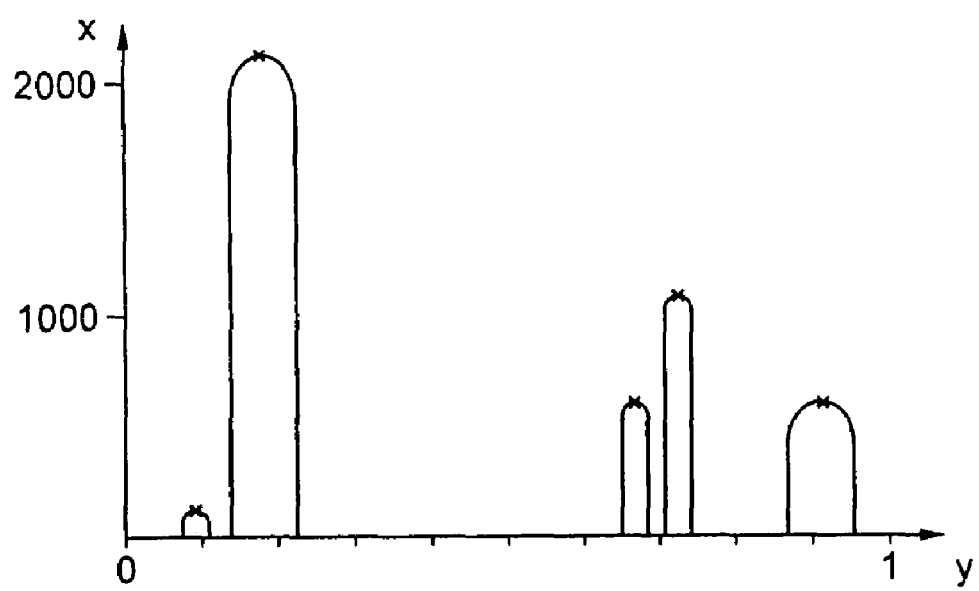
FIG. 3 is a CSS representation of the outline of FIG. 2.

FIG. 1 shows a computerised video database system according to an embodiment of the invention. The system includes a control unit 2 in the form of a computer, a display unit 4 in the form of a monitor, a pointing device 6 in the form of a mouse, an image database 8 including stored still and video images and a descriptor database 10 storing descriptors of objects or parts of objects appearing in images stored in the image database 8.

A descriptor for the shape of each object of interest appearing in an image in the image database is derived by the control unit 2 and stored in the descriptor database 10. The control unit 2 derives the descriptors operating under the control of a suitable program implementing a method as described below.

Firstly, for a given object outline, a CSS representation of the outline is derived. This is done using the known method as described in one of the papers mentioned above.

More specifically, the outline is expressed by a representation $\Psi=\{(x(u), y(u), u \in [0, 1]\}$ where u is a normalised arc length parameter.

The outline is smoothed by convolving $\Psi$ with an 1D Gaussian kernel $g(u, \sigma)$, and the curvature zero crossings of the evolving curve are examined as $\sigma$ changes. The zero crossing are identified using the following expression for the curvature:

$$k(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}}$$

where $$X(u, \sigma) = x(u) * g(u, \sigma) \qquad Y(u, \sigma) = y(u) * g(u, \sigma)$$

and $$X_u(u, \sigma) = x(u) * g_u(u, \sigma) \quad X_{uu}(u, \sigma) = x(u) * g_{uu}(u, \sigma)$$

In the above, * represents convolution and subscripts represent derivatives.

The number of curvature zero crossings changes as $\sigma$ changes, and when $\sigma$ is sufficiently high $\Psi$ is a convex curve with no zero crossings.

The zero crossing points $(u, \sigma)$ are plotted on a graph, known as the CSS image space. This results in a plurality of curves characteristic of the original outline. The peaks of the characteristic curves are identified and the corresponding co-ordinates are extracted and stored. In general terms, this gives a set of n co-ordinate pairs [(x1,y1), (x2,y2), ... (xn, yn)], where n is the number of peaks, and xi is the arc-length position of the ith peak and yi is the peak height. These peak co-ordinates constitute the CSS representation.

In addition to the CSS representation, further parameters are associated with the shape to produce the shape descriptor. In this embodiment, the additional parameters are the eccentricity and circularity of the "prototype region" for the shape, where the "prototype region" of the shape is the contour of the shape after the final smoothing step, that is, at the point equivalent to the highest peak value σ. Other values of σ can be selected for the prototype region. This results in a shape descriptor for a shape S in the form: {EPR, CPR, PEAKS} where EPR represents the eccentricity of the prototype region, CPR the circularity of the prototype region, and PEAKS the CSS representation.

A method of searching for an object in an image in accordance with an embodiment of the invention will now be described.

Here, the descriptor database 10 of the system of FIG. 1 stores shape descriptors derived according to the method described above.

The user initiates a search by drawing an object outline on the display using the pointing device. The control unit 2 then derives a shape descriptor of the input outline in the manner described above. The control unit then performs a matching comparison with each shape descriptor stored in the database.

Suppose the input outline, Shape S1, is being compared with a stored shape S2, S1 and S2 being respective descriptors:

S1: {EPR1, CPR1, PEAKS1}
S2: {EPR2, CPR2, PEAKS2}

Where EPR means Eccentricity of the prototype region and CPR means Circularity of the prototype region, and PEAKS means the set of coordinates of peaks in the CSS image (the set can be empty). The similarity measure between two shapes is computed as follows.

$$M=a*abs((EPR2-EPR1)/(EPR2+EPR1))+b*abs((CPR2-CPR1)/((CPR2+CPR1))+SM(PEAKS1, PEAKS2)$$

Where a and b are two coefficients and SM is the standard similarity measure defined on the two sets of peaks [1], and abs denotes absolute value. SM is calculated using a known matching algorithm such as described in the above-mentioned papers can be used. That matching procedure is briefly described below.

Given two closed contour shapes, the image curve Ψi and the model curve Ψm and their respective sets of peaks {(xi1,yi1),(xi2,yi2), . . . ,(xin,yin)} and {(xm1,ym1), (xm2,ym2), . . . , (xmn,ymn)} the similarity measure is calculated. The similarity measure is defined as a total cost of matching of peaks in the model into peaks in the image. The matching which minimises the total cost is determined using a dynamic programming. The algorithm recursively matches the peaks from the model to the peaks from the image and calculates the cost of each such match. Each model peak can be matched with only one image peak and each image peak can be matched with only one model peak. Some of the model and or image peak may remain unmatched, and there is an additional penalty cost for each unmatched peak. Two peaks can be matched if their horizontal distance is less than 0.2. The cost of a match is the length of the straight line between the two matched peaks. The cost of an unmatched peak is its height.

In more detail the algorithm works by creating and expanding a tree-like structure, where nodes correspond to matched peaks:

1. Create starting node consisting of the largest maximum of the image (xik,yik) and the largest maximum of the model (xir,yir).

2. For each remaining model peak which is within 80 percent of the largest maximum of the image peaks create an additional starting node.

3. Initialise the cost of each starting node created in 1 and 2 to the absolute difference of the y-coordinate of the image and model peaks linked by this node.

4. For each starting node in 3, compute the CSS shift parameter alpha, defined as the difference in the x (horizontal) coordinates of the model and image peaks matched in this starting node. The shift parameter will be different for each node.

5. For each starting node, create a list of model peaks and a list of image peaks. The list hold information which peaks are yet to be matched. For each starting node mark peaks matched in this node as "matched", and all other peaks as "unmatched". 6. Recursively expand a lowest cost node (starting from each node created in steps 1-6 and following with its children nodes) until the condition in point 8 is fulfilled. To expand a node use the following procedure:

7. Expanding a node:

If there is at least one image and one model peak left unmatched:

select the largest scale image curve CSS maximum which is not matched (xip,yip). Apply the starting node shift parameter (computed in step 4) to map the selected maximum to the model CSS image—now the selected peak has coordinates (xip−alpha, yip). Locate the nearest model curve peak which is unmatched (xms,yms). If the horizontal distance between the two peaks is less than 0.2 (i.e: |xip−alpha−xms|<0.2), match the two peaks and define the cost of the match as the length of the straight line between the two peaks. Add the cost of the match to the total cost of that node. Remove the matched peaks from the respective lists by marking them as "matched". If the horizontal distance between the two peaks is greater than 0.2, the image peak (xip,yip) cannot be matched. In that case add its height yip to the total cost and remove only the peak (xip,yip) from the image peak list by marking it as "matched".

Otherwise (There are only image peaks or there are only model peaks left unmatched):

Define the cost of the match as the height of the highest unmatched image or model peak and remove that peak from the list.

8. If after expanding a node in 7 there are no unmatched peaks in both the image and model lists, the matching procedure is terminated. The cost of this node is the similarity measure between the image and model curve. Otherwise, go to point 7 and expand the lowest cost node.

The above procedure is repeated with the image curve peaks and the model curve peaks swapped. The final matching value is the lower of the two.

The above steps are repeated for each model in the database.

The similarity measures resulting from the matching comparisons are ordered and the objects corresponding to the descriptors having similarity measures indicating the closest match (i.e. here the lowest similarity measures) are then displayed on the display unit 4 for the user. The number of objects to be displayed can be pre-set or selected by the user.

In an alternative implementation, different parameters can be used to describe the shape of the "prototype region". For example three Fourier coefficients of the curve can be used. The similarity measure can be defined as follows:

$$M=a*EUC(F1,F2)+SM(PEAKS1, PEAKS2)$$

Where EUC is a Euclidean distance between vectors F1 and F2 formed from three main Fourier Coefficients of the model and image shape, a is a constant, and SM represents the similarity measure for the CSS peaks, calculated using a method essentially as described above.

INDUSTRIAL APPLICABILITY

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described may be provided in software or hardware form. Although the invention has been described in the form of a computer system, it could be implemented in other forms, for example using a dedicated chip.

Specific examples have been given of methods of representing a 2D shape of an object and of methods for calculating values representing similarities between two shapes but any suitable such methods can be used.

The invention can also be used, for example, for matching images of objects for verification purposes, or for filtering.

The invention claimed is:

1. A method of searching for an object in an image or sequence of images by processing signals corresponding to the image or images using one or more processors, the method comprising
   inputting a query in the form of a two-dimensional outline;
   deriving, using a processor, a curvature scale space (CSS) representation of the object outline by smoothing the object outline;
   deriving, using a processor, at least one additional parameter reflecting the shape or mass distribution of a smoothed version of the original outline;
   deriving, using a processor, a query descriptor by associating the CSS representation and the additional parameter;
   comparing said query descriptor with each descriptor for stored objects using a matching procedure using the CSS values and the additional parameters to derive, using a processor, a similarity measure; and
   selecting and displaying at least one result corresponding to an image containing an object for which the comparison indicates a degree of similarity between the query and said object.

2. A method as claimed in claim 1 wherein an additional parameter relates to the smoothed outline corresponding to a peak in the CSS image.

3. A method as claimed in claim 2 wherein an additional parameter relates to the smoothed outline corresponding to the highest peak in the CSS image.

4. A method as claimed in claim 1 wherein an additional parameter corresponds to the eccentricity of the outline.

5. A method as claimed in claim 1 wherein an additional parameter corresponds to the circularity of the outline.

6. A method as claimed in claim 1 wherein at least one additional parameter uses a region-based representation.

7. A method as claimed in claim 6 wherein an additional parameter is a region moment invariant.

8. A method as claimed in claim 6 wherein an additional parameter is based on Fourier descriptors.

9. A method as claimed in claim 6 wherein an additional parameter is based on Zernike moments of the region enclosed by the outline.

10. A method as claimed in claim 1 wherein the similarity measure is based on M where $M=a*GP\text{-}S+CSS\text{-}S$ where GP-S is the similarity measure between additional parameters of the compared object outlines and CSS-S is the similarity measure between the CSS values for the compared object outlines, and a is a constant.

11. A method as claimed in claim 10 where a depends on the number and height of the CSS peaks.

12. A method as claimed in claim 10 where a=1 when there are no CSS peaks associated with either outline and a=0 when at least one outline has a CSS peak.

13. An apparatus comprising:
   an image database storing images or sequences of images;
   a descriptor database storing descriptors of objects or parts of objects appearing in images stored in the image database; and
   a processor configured to perform the method as claimed in claim 1.

14. A computer-readable storage medium storing computer-executable process steps for implementing a method as claimed in claim 1.

15. A computer system comprising:
   an image database storing images or sequences of images;
   a descriptor database storing descriptors of objects or parts of objects appearing in images stored in the image database; and
   a control unit programmed to perform the method as claimed in claim 1.

* * * * *

UNITED STATES PATENT AND TRADEMARK OFFICE
CERTIFICATE OF CORRECTION

| | | |
|---|---|---|
| PATENT NO. | : 7,574,049 B2 | Page 1 of 1 |
| APPLICATION NO. | : 11/980482 | |
| DATED | : August 11, 2009 | |
| INVENTOR(S) | : Miroslaw Z. Bober | |

It is certified that error appears in the above-identified patent and that said Letters Patent is hereby corrected as shown below:

ON THE TITLE PAGE:

At Item (62), Related U.S. Application Data, change

"Division of Application No. 09/786,352, filed Mar. 13, 2001"

to

--Division of Application No. 09/786,352, derived from PCT/JP2000/004673 dated Jul. 12, 2000--.

Insert item --(30), Foreign Application Priority Data,

Jul. 15, 1999   (GB)   .......... 9916684.5--

Signed and Sealed this

Second Day of November, 2010

David J. Kappos
*Director of the United States Patent and Trademark Office*